United States Patent
Li et al.

(10) Patent No.: US 12,220,680 B2
(45) Date of Patent: Feb. 11, 2025

(54) RED MUD-BASED SEWAGE TREATMENT AGENT AND PREPARATION METHOD THEREOF, RED MUD-BASED CERAMSITE CONCRETE AND PREPARATION METHOD THEREOF, AND APPLICATIONS

(71) Applicant: SHANDONG UNIVERSITY, Shandong (CN)

(72) Inventors: Shucai Li, Jinan (CN); Jian Zhang, Jinan (CN); Zhaofeng Li, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 980 days.

(21) Appl. No.: 17/283,591

(22) PCT Filed: Apr. 3, 2020

(86) PCT No.: PCT/CN2020/083229
§ 371 (c)(1),
(2) Date: Apr. 8, 2021

(87) PCT Pub. No.: WO2021/168995
PCT Pub. Date: Sep. 2, 2021

(65) Prior Publication Data
US 2022/0143571 A1   May 12, 2022

(30) Foreign Application Priority Data
Feb. 28, 2020  (CN) .......................... 202010127619.4

(51) Int. Cl.
| | | |
|---|---|---|
| *B01J 20/00* | (2006.01) | |
| *B01J 20/12* | (2006.01) | |
| *B01J 20/18* | (2006.01) | |
| *B01J 20/26* | (2006.01) | |
| *B01J 20/30* | (2006.01) | |
| *C02F 1/28* | (2023.01) | |

(52) U.S. Cl.
CPC ............. *B01J 20/12* (2013.01); *B01J 20/183* (2013.01); *B01J 20/261* (2013.01); *B01J 20/3021* (2013.01); *B01J 20/3028* (2013.01); *B01J 20/3042* (2013.01); *B01J 20/3078* (2013.01); *B01J 20/3085* (2013.01); *C02F 1/281* (2013.01)

(58) Field of Classification Search
None
See application file for complete search history.

(56) References Cited

U.S. PATENT DOCUMENTS 9,187,342 B2 * 11/2015 Isovitsch Parks ...... C02F 1/281

FOREIGN PATENT DOCUMENTS

| | | | |
|---|---|---|---|
| CN | 101143312 A | | 3/2008 |
| CN | 102240536 A | | 11/2011 |
| CN | 102951887 A | | 3/2013 |
| CN | 103920457 A | | 7/2014 |
| CN | 105289462 A | * | 2/2016 |
| CN | 107051413 A | | 8/2017 |
| CN | 108543517 A | | 9/2018 |
| CN | 109825303 A | * | 5/2019 |
| CN | 109970378 A | | 7/2019 |
| CN | 110078451 A | | 8/2019 |
| CN | 110170295 A | * | 8/2019 |
| CN | 110204258 A | | 9/2019 |
| CN | 110759680 A | | 2/2020 |
| KR | 101439236 B1 | | 9/2014 |
| KR | 101762551 B1 | | 8/2017 |

OTHER PUBLICATIONS

CN-105289462-A, English translation (Year: 2016).*
CN-110170295-A, English translation (Year: 2019).*
CN-109825303-A, English translation (Year: 2019).*
Nov. 20, 2020 International Search Report issued in International Patent Application No. PCT/CN2020/083229.
Nov. 20, 2020 Written Opinion issued in International Patent Application No. PCT/CN2020/083229.
Oct. 10, 2020 Office Action issued in Chinese Patent Application No. 202010127619.4.

* cited by examiner

Primary Examiner — Stefanie J Cohen
(74) Attorney, Agent, or Firm — Oliff PLC

(57) ABSTRACT

A red mud-based sewage treatment agent and a preparation method thereof, a red mud-based ceramsite concrete and a preparation method thereof, and applications, the agent including the following components: 80-90% of a solid waste complex after acidification treatment, 2-15% of an alkali activator, 0-1.0% of a water reducer, 0.5-2.0% of an ultrafine additive, and 1.0-5.0% of a treatment agent. The solid waste complex includes: at least one of red mud powder, blast furnace slag powder, fly ash, coal gangue powder and iron tailings powder. First, the red mud is modified to prepare an intermediate product, namely the red mud-based sewage treatment agent, which is used for absorption of pollutants in sewage and then used as a raw material again to prepare a final product, namely the red mud-based ceramsite concrete. Progressive comprehensive utilization of the red mud is realized, and adsorbed pollution factors can be sealed in the final product.

15 Claims, No Drawings

RED MUD-BASED SEWAGE TREATMENT AGENT AND PREPARATION METHOD THEREOF, RED MUD-BASED CERAMSITE CONCRETE AND PREPARATION METHOD THEREOF, AND APPLICATIONS

BACKGROUND

Technical Field

The present invention relates to the technical field of resource utilization of red mud, and particularly relates to a red mud-based sewage treatment agent and a preparation method thereof, a red mud-based ceramsite concrete and a preparation method thereof, and applications.

Related Art

Information of the Related Art part is merely disclosed to increase the understanding of the overall background of the present invention, but is not necessarily regarded as acknowledging or suggesting, in any form, that the information constitutes the prior art known to a person of ordinary skill in the art.

With the vigorous development of the world economy, while consuming a large amount of resources, a large amount of solid wastes, sewage and tail gas have also been produced, which has affected the regional ecological environment, the social and economic development and the life safety of residents. Red mud is a solid waste of the aluminum industry. The world produces hundreds of millions of tons of red mud each year, and the production of a large amount of red mud has caused direct and indirect influences on human production and life in a plurality of aspects. However, the utilization rate of the red mud is low at present, so it is extremely urgent to reduce the yield and harms of the red mud to the maximum extent and realize multi-channel and large-scale resource utilization.

At present, the red mud is mainly used in preparation of cement admixtures for building materials or preparation of raw materials for cement, but due to the strong alkalinity of the red mud, the utilization rate is less than 30%. The red mud can also be used to extract non-ferrous metal elements, such as titanium and antimony. In addition, the red mud can be used in the preparation of sewage treatment agents, and other environmental protection fields. However, the inventor found that the current utilization of the red mud still has the defects including low utilization rate, high utilization cost and easiness to cause secondary pollution.

SUMMARY

In view of the above-mentioned problems in the prior art, the present invention proposes a progressive comprehensive utilization method of red mud based on the collaborative concept, including a red mud-based sewage treatment agent and a preparation method thereof, and a red mud-based ceramsite concrete and a preparation method thereof. The technical solution of the present invention cannot only realize the large-volume utilization of red mud, but also effectively solve the defect that the utilization of red mud is likely to cause secondary pollution, so as to reduce the negative impacts of the utilization of red mud on the ecological environment.

The first objective of the present invention is to provide a red mud-based sewage treatment agent and a preparation method thereof.

The second objective of the present invention is to provide a red mud-based ceramsite concrete and a preparation method thereof.

The third objective of the present invention is to provide applications of the red mud-based sewage treatment agent and the red mud-based ceramsite concrete.

In order to realize the above-mentioned objectives of the present invention, the present invention specifically discloses the following technical solution:

Firstly, the present invention discloses a red mud-based sewage treatment agent. The raw material composition of the red mud-based sewage treatment agent includes the following components in mass percent: 80-90% of a solid waste complex, 2.0-15% of an alkali activator, 0-1.0% of a water reducer, 0.5-2.0% of an ultrafine additive and 1.0-5.0% of a surfactant. The solid waste complex includes: at least one of 0-40% of blast furnace slag powder, 0-50% of fly ash, 0-30% of coal gangue powder and 0-35% of iron tailings powder and 40-60% of red mud powder, and the solid waste complex is subjected to acidification treatment by industrial tail gas.

Further, the industrial tail gas is waste gas containing acidic gases such as carbon dioxide and sulfur dioxide. By using the industrial tail gas containing acidic gases such as carbon dioxide to perform acidification treatment on the solid waste complex, carbon dioxide in the industrial tail gas is utilized, and furthermore, the industrial tail gas can also react with alkaline metal oxides in the solid waste complex to realize the modification of the solid waste. Reasons are as follows: (1) during the acidification reaction, alkaline oxides in the red mud can generate ultrafine particles such as nano calcium carbonate and nano magnesium carbonate, which can increase the adsorption efficiency in the later sewage treatment process; (2) the alkalinity of the system can be reduced, the leaching amount of alkaline substances can be reduced, and secondary pollution caused by the later product utilization process can be prevented; and (3) the emission of carbon dioxide in the industrial tail gas can be reduced while disposing the solid waste complex.

Further, the ultrafine additive has the effect of synergistically adsorbing pollutants in sewage, and includes: one or more of ultrafine zeolite, ultra fine silica fume and ultrafine metal organic framework materials etc. Solid wastes such as red mud and blast furnace slag have abundant void structures inside, and additives can be distributed in these voids to increase the adsorption site of the treatment agent for pollutants, thereby improving the adsorption property and also improving the solidification ability of pollutants.

Further, the surfactant includes: one or more of cetyl ammonium bromide, fatty amines and sodium linear alkyl benzene sulfonate etc. The surfactant can increase the fusion between the components of the treatment agent and improve the uniformity of distribution of the components.

Further, the red mud-based sewage treatment agent is spherical, and the diameter of the red mud-based sewage treatment agent is 5.0 mm-40 mm. Compared with other forms, the spherical red mud-based sewage treatment agent can be prepared by granulation, which is convenient and fast and does not substantially affect the adsorption and purification treatment of the treatment agent on sewage.

Further, the solid waste complex is obtained by mixing the components after grinding, drying and sieving. By means of the above-mentioned treatment, the distribution of the components in the solid waste complex can be more uniform, and the uniformity of the property of the treatment agent can be ensured.

Optionally, the red mud includes: any one of the red muds produced by a Bayer method, a sintering method or a combination method. Stable quality of the red mud is ensured, and the prepared product has good mechanical properties.

Optionally, the alkali activator includes: any one or more of sodium hydroxide, sodium silicate, potassium hydroxide, potassium silicate, sodium carbonate and ordinary Portland cement clinker etc.

Optionally, the water reducer includes: any one of a polycarboxylic acid water reducer, an aliphatic water reducer, a naphthalene water reducer, a melamine water reducer and a lignosulfonate water reducer etc.

Secondly, the present invention discloses a preparation method of the red mud-based sewage treatment agent, including the following steps:

(1) drying, grinding and sieving at least one of blast furnace slag, fly ash, coal gangue and iron tailings powder and red mud respectively, and then, uniformly mixing the obtained powder in proportion to obtain a solid waste complex;

(2) performing acidification treatment on the solid waste complex obtained in step (1) by means of industrial tail gas in heating and pressurizing states, and after the acidification treatment is completed, drying, grinding and sieving the obtained solid waste complex to obtain a modified solid waste complex; and (3) uniformly mixing the modified solid waste complex in step (2), the alkali activator, the water reducer, the ultrafine additive and the treatment agent in proportion, and then, pulping, granulating and curing the obtained mixture to obtain a red mud-based sewage treatment agent.

Further, in step (2), the conditions of the acidification treatment are as follows: the pressure is 0.2-2.0 MPa, the temperature is 60-400° C., the humidity is 40-100%, and the time is 2.0-36 h. The condition of setting certain humidity is mainly to facilitate acidic gases to dissolve in the water vapor to form acid liquid to fully contact and react with the solid waste.

Further, in step (3), the water-cement ratio in the pulping step is 0.2-0.5.

Further, in step (3), the curing method is as follows: the curing is performed for 20-24 hours under natural conditions.

In the present invention, first, the red mud is modified to prepare an intermediate product, namely the red mud-based sewage treatment agent, which is used for absorption of pollutants in sewage and then used as a raw material again to prepare a final product, namely the red mud-based ceramsite concrete, so that progressive comprehensive utilization of the red mud is realized, and adsorbed pollution factors can be sealed in the final product, so as to ensure that the final product is environmentally friendly.

Secondly, the present invention discloses a red mud-based ceramsite concrete. The raw material composition of the red mud-based ceramsite concrete includes the following components in mass percent: 15-30% of the solid waste complex after acidification treatment (modified solid waste complex), 55-75% of the red mud-based sewage treatment agent after adsorption of pollutants (aggregate), and the balance of water. A shell formed by mixing the solid waste complex after acidification treatment with water is coated on the surface of the red mud-based sewage treatment agent after adsorption of pollutants. It should be noted that the water here may also be the remaining part after the prepared red mud-based sewage treatment agent is dried.

Further, the red mud-based ceramsite concrete further includes an auxiliary agent. Optionally, the auxiliary agent includes: at least one of a reinforcing agent, an alkali activator and a water reducer etc. A shell formed by mixing the solid waste complex after acidification treatment, the reinforcing agent, the alkali activator and the water reducer with water is coated on the surface of the red mud-based sewage treatment agent after adsorption of pollutants. It should be noted that the water here may also be the remaining part after the prepared red mud-based sewage treatment agent is dried.

Further, the reinforcing agent accounts for 0.5-4% of the mass of the solid waste complex after acidification treatment, the water reducer accounts for 0.2-1.0% of the mass of the solid waste complex after acidification treatment, and the alkali activator accounts for 6-20% of the mass of the solid waste complex after acidification treatment.

Further, the reinforcing agent includes: at least one of carbide slag, sulphoaluminate cement, nano calcium carbonate, nano alumina, silica sol and sodium metaaluminate. The alkali activator and the water reducer have been mentioned above, and will not be repeated here.

Subsequently, the present invention discloses a preparation method of the red mud-based ceramsite concrete, including the following steps: mixing the solid waste complex after acidification treatment, the red mud-based sewage treatment agent after adsorption of pollutants, the alkali activator, the reinforcing agent and the water reducer in proportion, then adding water, stirring the obtained mixture to form a pulp coating layer on the surface of the red mud-based sewage treatment agent, and performing curing to obtain the red mud-based ceramsite concrete.

Finally, the present invention further discloses applications of the red mud-based sewage treatment agent in sewage treatment, and applications of the red mud-based ceramsite concrete in the field of construction engineering.

Compared with the prior art, the present invention has the following beneficial effects:

(1) By preparing the red mud-based sewage treatment agent and the red mud-based ceramsite concrete, the present invention can realize large-scale utilization of solid wastes to improve the utilization rate of these bulk solid wastes, and has the advantages of low production cost, universal applicability and easy large-scale production.

(2) Based on the concept of cooperative utilization, the present invention uses industrial waste gas to perform acidification on solid wastes, thereby realizing treatment of wastes with processes of wastes against one another, and also reducing carbon emission so as to realize resource utilization of the industrial waste gas. Furthermore, through the modification of solid wastes due to acidification, the prepared product has good properties and no secondary pollution and can obtain significant economic and environmental benefits.

(3) In the present invention, a modified red mud-based sewage treatment sphere after absorption of pollutants is used as aggregate and then is mixed with the solid waste complex pulp after acidification treatment by industrial tail gas to prepare a series of red mud-based cementing materials. Final products, such as red mud-based pervious concrete, red mud-based baking-free bricks and red mud-based marine materials can be formed. The present invention realizes the effective solidification of the pollution factors adsorbed in the red mud-based sewage treatment agent, and avoids secondary pollution of the final products in later use processes as much as possible. Furthermore, the present invention embodies the idea of progressive comprehensive utilization of red mud. This progressive utilization method ultimately ensures that solid wastes and pollution factors can stably play roles in the form of beneficial resources for a long time, and cannot be converted into solid wastes again in a short time.

DETAILED DESCRIPTION

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to the present application. As used herein, the singular form is also intended to include the plural form unless the context clearly dictates otherwise. In addition, it should further be understood that, terms "include" and/or "comprise" used in this specification indicate that there are features, steps, operations, devices, components, and/or combinations thereof.

As introduced by the background technology, the inventor found that the current utilization of the red mud still has the defects including low utilization rate, high utilization cost and easiness to cause secondary pollution. Therefore, the present invention proposes a red mud-based sewage treatment agent and a preparation method thereof, and a red mud-based ceramsite concrete and a preparation method thereof. The present invention will be further described below in conjunction with specific embodiments.

Description of Involved Terms

The term "water-cement ratio" refers to a weight ratio of the amount of water to the amount of solid materials. It is well known that the water-cement ratio affects the rheological properties of the pulp, the cohesive structure and the compactness after hardening. Therefore, for a certain composition material, the water-cement ratio has an appropriate ratio range, and a too large or too small water-cement ratio will affect the properties such as strength.

The term "cementing material" refers to an inorganic cementing material of the red mud-based ceramsite concrete prepared in the present invention, which is mainly used as a construction material. In construction engineering, the cementing material can cement bulk materials (such as sand and stone) into a whole material, so as to form a composite solid with certain mechanical strength.

The term "water reducer" refers to a concrete admixture that can reduce the amount of water used for mixing while maintaining the slump of the concrete basically unchanged, such as a lignosulfonate water reducer and a polycarboxylic acid water reducer. The water reducer can reduce the amount of water and improve the porosity and mechanical strength of the sewage treatment agent.

The term "alkali activator" is mainly used in the cementing material, and the catalytic principle of the alkali activator can promote the hydration of the cementing material.

The term "red mud" refers to the polluting waste slag discharged from the aluminum industry during the extraction of alumina. The red mud contains components such as $SiO_2$, $Al_2O_3$ and CaO, the leaching liquid is alkaline, and the pH value is as high as 12 or more. By means of the acidification treatment, the present invention realizes the modification of the components of the red mud, and also avoids the negative impacts caused by strong alkalinity of the red mud.

The term "blast furnace slag" refers to a kind of waste slag discharged from a blast furnace when smelting pig iron. The main chemical components of the blast furnace slag include $SiO_2$, $Al_2O_3$, CaO, MgO, MnO and FeO. By means of the acidification treatment, the present invention realizes the functional utilization of elements such as calcium and magnesium, which helps to improve the adsorption and solidification properties of the sewage treatment agent to pollutants.

The term "fly ash" refers to fine ash collected from the flue gas after coal combustion. The fly ash is the main solid waste discharged from coal-fired power plants. The fly ash mainly contains metal oxides such as $SiO_2$, $Al_2O_3$, FeO, $Fe_2O_3$, CaO and $TiO_2$. In the present invention, by means of the acidification treatment, metal elements such as calcium and iron are converted into nano carbonates, which helps to improve the adsorption and solidification properties of the sewage treatment agent for pollutants.

The term "coal gangue" refers to the solid waste discharged from a coal mining process and a coal washing process. The coal gangue has a low carbon content and a hard texture, so that the coal gangue is difficult to directly use as fuel like coal. The main components of the coal gangue are $Fe_2O_3$, CaO, MgO, $Na_2O$, $K_2O$, and the like. The coal gangue contains many alkali metal oxides. In the present invention, by means of carbonization treatment, nano carbides are formed and distributed in the treatment agent, which becomes a favorable factor for improving the adsorption property.

The term "iron tailings" refer to wastes after mineral separation. The main component of the iron tailings is $SiO_2$, and the iron tailings also contain some $Al_2O_3$, $Fe_2O_3$, MgO, $Na_2O$, $K_2O$, and the like. In the present invention, the carbonization treatment on this solid waste helps to improve the adsorption property of the sewage treatment agent for pollutants. Furthermore, high-content silica can also be used as a framework material to ensure that the obtained treatment agent has certain hardness to prevent the treatment agent from being loosened after being soaked in sewage, which is not conducive to preparing the final product of the present invention after recovery.

The term "industrial tail gas" includes industrial waste gas containing acidic gases such as carbon dioxide and/or sulfur dioxide discharged from thermal power plants, steel plants, metal smelters, chemical plants, cement plants, and industrial or civil boilers.

The term "acidification treatment" refers to the process of converting the existing form of certain metal elements in the solid waste through the carbon dioxide in the above-mentioned tail gas to obtain nano carbonates. Furthermore, the acidic property of the carbon dioxide can also be used to eliminate the problem of secondary pollution caused by certain alkaline solid wastes.

In the following embodiments, the red mud was purchased from Weiqiao Pioneering Co., Ltd and was ground, dried and sieved with a 400-mesh square hole sieve in the present invention to obtain slag powder used in the embodiments of the present invention.

In the following embodiments, the blast furnace slag was purchased from Lubi New Materials Co., Ltd., and was ground, dried and sieved with a 400-mesh square hole sieve in the present invention to obtain slag powder used in the embodiments of the present invention.

In the following embodiments, the coal gangue was purchased from Qiuji Coal Mine, and was ground, dried and sieved with a 400-mesh square hole sieve in the present invention to obtain coal gangue powder used in the embodiments of the present invention.

In the following embodiments, the fly ash was purchased from Weiqiao Pioneering Group Co., Ltd., and was ground, dried and sieved with a 400-mesh square hole sieve in the present invention to obtain smaller-scale target fly ash used in the embodiments of the present invention.

In the following embodiments, the iron tailings were purchased from Zhangmatun Iron Mine, and were ground, dried and sieved with a 400-mesh square hole sieve in the present invention to obtain iron tailings powder used in the embodiments of the present invention.

In the following embodiments, various solid wastes were obtained by grinding, drying and sieving with a 400-mesh square hole sieve.

In the following embodiments, the pollutant composition and pH value in sewage (simulation) were shown in Table 1.

TABLE 1

| Chemical composition of sewage (unit: mg/L) | | | | | | |
|---|---|---|---|---|---|---|
| $Ca^{2+}$ | $Cu^{2+}$ | $Cl^-$ | $SO_4^{2-}$ | $NO_3^-$ | COD (%) | pH |
| 34.4 | 41.6 | 130 | 0.28 | 12.7 | 39 | 7.82 |

First Embodiment

1. A preparation method of a red mud-based sewage treatment agent includes the following steps:
  (1) in mass percent, red mud and blast furnace slag were respectively dried and ground and then sieved with a 400-mesh sieve to obtain red mud micro-powder and blast furnace slag micro-powder, and the red mud micro-powder and the blast furnace slag micro-powder were mixed in a mass ratio of 6:4 to obtain a solid waste complex;
  (2) simulated industrial tail gas (mass concentration of carbon dioxide was about 16%) was used to perform acidification treatment on the solid waste complex obtained in step (1) for 4.0 h under the conditions that the temperature was 100° C., the humidity was 80% and the pressure was 1.0 MPa, and after the acidification treatment was completed, the solid waste complex was dried and ground and then sieved with a 400-mesh sieve to obtain a modified solid waste complex; and
  (3) in mass percent, 90% of the modified solid waste complex obtained in step (2), 0.4% of a polycarboxylic acid water reducer, 4.0% of sodium silicate, 2.0% of ultrafine zeolite (900 meshes) and 3.6% of cetyl ammonium bromide were mixed uniformly for pulping according to a water-cement ratio of 0.35, then granulating was performed in a granulating machine, and after the granulating was completed, natural curing was performed for 24 h to prepare a spherical red mud-based sewage treatment agent with a diameter 5.0-8.0 mm.

2. A preparation method of a red mud-based ceramsite concrete includes the following steps:
  (I) the red mud-based sewage treatment agent prepared in step (3) of the present embodiment was placed in sewage (see Table 1 for components) to adsorb pollutants, after the concentration of the pollutants in the sewage remains unchanged, an adsorption saturation state was reached, and the red mud-based sewage treatment agent was dried for later use; and
  (II) preparation of the red mud-based ceramsite concrete: in mass percent, 30% of solid waste complex micro-powder after acidification treatment, 15% of water, 55% of the red mud-based sewage treatment agent obtained in step (I), sodium silicate accounting for 10% of the mass of the solid waste complex, ultrafine silica fume (900 meshes) accounting for 4.0% of the mass of the solid waste complex, and a polycarboxylic acid water reducer accounting for 1.0% of the mass of the solid waste complex were weighed, then the solid waste complex micro-powder, the red mud-based sewage treatment agent, the sodium silicate, the ultrafine silica fume and the polycarboxylic acid water reducer were put into a forced stirrer first so as to be stirred, then water was poured into the forced stirrer, the obtained mixture was stirred to form a pulp coating layer on the surface of the red mud-based sewage treatment agent, and natural curing was performed for 24 h to obtain the red mud-based ceramsite concrete.

Second Embodiment

1. A preparation method of a red mud-based sewage treatment agent includes the following steps:
  (1) in mass percent, red mud, coal gangue and iron tailings were respectively dried and ground and then sieved with a 400-mesh sieve to obtain red mud micro-powder, coal gangue micro-powder and iron tailings micro-powder, and the red mud micro-powder, the coal gangue micro-powder and the iron tailings micro-powder were mixed in a mass ratio of 6:3:1 to obtain a solid waste complex;
  (2) simulated industrial tail gas (mass concentration of carbon dioxide was about 16%) was used to perform acidification treatment on the solid waste complex obtained in step (1) for 4 h under the conditions that the temperature was 200° C., the humidity was 100% and the pressure was 2.0 MPa, and after the acidification treatment was completed, the solid waste complex was dried and ground and then sieved with a 400-mesh sieve to obtain a modified solid waste complex; and
  (3) in mass percent, 90% of the modified solid waste complex obtained in step (2), 0.4% of a naphthalene water reducer, 4.0% of sodium hydroxide, 2.0% of ultrafine zeolite (900 meshes) and 3.6% of sodium dodecylsulfonate were mixed uniformly for pulping according to a water-cement ratio of 0.3, then granulating was performed in a granulating machine, and after the granulating was completed, natural curing was performed for 24 h to prepare a spherical red mud-based sewage treatment agent with a diameter 9.0-13.0 mm.

2. A preparation method of a red mud-based ceramsite concrete includes the following steps:
  (I) the red mud-based sewage treatment agent prepared in step (3) of the present embodiment was placed in sewage (see Table 1) to adsorb pollutants, after the concentration of the pollutants in the sewage remains unchanged, an adsorption saturation state was reached, and the red mud-based sewage treatment agent was dried for later use; and
  (II) preparation of the red mud-based ceramsite concrete: in mass percent, 30% of solid waste complex micro-powder after acidification treatment, 15% of water, 55% of the red mud-based sewage treatment agent obtained in step (I), sodium silicate accounting for 10% of the mass of the solid waste complex, nano calcium carbonate accounting for 4.0% of the mass of the solid waste complex, and a naphthalene water reducer accounting for 1.0% of the mass of the solid waste complex were weighed, then the solid waste complex micro-powder, the red mud-based sewage treatment agent, the sodium silicate, the nano calcium carbonate and the naphthalene water reducer were put into a forced stirrer first so as to be stirred, then water was poured into the forced stirrer, the obtained mixture was stirred to form a pulp coating layer on the surface of the red mud-based sewage treatment agent, and natural curing was performed for 24 h to obtain the red mud-based ceramsite concrete.

Third Embodiment

1. A preparation method of a red mud-based sewage treatment agent includes the following steps:
   (1) in mass percent, red mud and fly ash were respectively dried and ground and then sieved with a 400-mesh sieve to obtain red mud micro-powder and fly ash micro-powder, and the red mud micro-powder and the fly ash micro-powder were mixed in a mass ratio of 6:4 to obtain a solid waste complex;
   (2) simulated industrial tail gas (mass concentration of carbon dioxide was about 16%) was used to perform acidification treatment on the solid waste complex obtained in step (1) for 4 h under the conditions that the temperature was 150° C., the humidity was 80% and the pressure was 1.5 MPa, and after the acidification treatment was completed, the solid waste complex was dried and ground and then sieved with a 400-mesh sieve to obtain a modified solid waste complex; and
   (3) in mass percent, 90% of the modified solid waste complex obtained in step (2), 0.5% of an aliphatic water reducer, 3.0% of potassium silicate, 1.0% of ultrafine metal organic framework materials (ZIFs, 800 meshes), and 5.0% of cetyl ammonium bromide were mixed uniformly for pulping according to a water-cement ratio of 0.5, then granulating was performed in a granulating machine, and after the granulating was completed, natural curing was performed for 24 h to prepare a spherical red mud-based sewage treatment agent with a diameter 15-21 mm.

2. A preparation method of a red mud-based ceramsite concrete includes the following steps:
   (I) the red mud-based sewage treatment agent prepared in step (3) of the present embodiment was placed in sewage to adsorb pollutants, after the concentration of the pollutants in the sewage remains unchanged, an adsorption saturation state was reached, and the red mud-based sewage treatment agent was dried; and
   (II) preparation of the red mud-based ceramsite concrete: in mass percent, 20% of solid waste complex micro-powder after acidification treatment, 20% of water, 60% of the red mud-based sewage treatment agent obtained in step (I), sodium hydroxide accounting for 6.0% of the mass of the solid waste complex, nano alumina accounting for 0.5% of the mass of the solid waste complex, and an aliphatic water reducer accounting for 0.5% of the mass of the solid waste complex were weighed, then the solid waste complex micro-powder, the red mud-based sewage treatment agent, the sodium hydroxide, the nano alumina and the aliphatic water reducer were put into a forced stirrer first so as to be stirred, then water was poured into the forced stirrer, the obtained mixture was stirred to form a pulp coating layer on the surface of the red mud-based sewage treatment agent, and natural curing was performed for 24 h to obtain the red mud-based ceramsite concrete.

Fourth Embodiment

1. A preparation method of a red mud-based sewage treatment agent includes the following steps:
   (1) in mass percent, red mud, fly ash and iron tailings were respectively dried and ground and then sieved with a 400-mesh sieve to obtain red mud micro-powder, fly ash micro-powder and iron tailings micro-powder, and the red mud micro-powder, the fly ash micro-powder and the iron tailings micro-powder were mixed in a mass ratio of 4:5:1 to obtain a solid waste complex;
   (2) simulated industrial tail gas (mass concentration of carbon dioxide was about 16%) was used to perform acidification treatment on the solid waste complex obtained in step (1) for 36 h under the conditions that the temperature was 60° C., the humidity was 40% and the pressure was 2.0 MPa, and after the acidification treatment was completed, the solid waste complex was dried and ground and then sieved with a 400-mesh sieve to obtain a modified solid waste complex; and
   (3) in mass percent, 80% of the modified solid waste complex obtained in step (2), 1% of a polycarboxylic acid water reducer, 15% of sodium silicate, 1.0% of ultrafine zeolite (900 meshes) and 3.0% of cetyl ammonium bromide were mixed uniformly for pulping according to a water-cement ratio of 0.35, then granulating was performed in a granulating machine, and after the granulating was completed, natural curing was performed for 20 h to prepare a spherical red mud-based sewage treatment agent with a diameter 33-37 mm.

2. A preparation method of a red mud-based ceramsite concrete includes the following steps:
   (I) the red mud-based sewage treatment agent prepared in step (3) of the present embodiment was placed in sewage to adsorb pollutants, after the concentration of the pollutants in the sewage remains unchanged, an adsorption saturation state was reached, and the red mud-based sewage treatment agent was dried for later use; and
   (II) preparation of the red mud-based ceramsite concrete: in mass percent, 15% of solid waste complex micro-powder after acidification treatment, 10% of water, 75% of the red mud-based sewage treatment agent obtained in step (I), sodium carbonate accounting for 20% of the mass of the solid waste complex, nano alumina accounting for 2.5% of the mass of the solid waste complex, and a polycarboxylic acid water reducer accounting for 0.2% of the mass of the solid waste complex were weighed, then the solid waste complex micro-powder, the red mud-based sewage treatment agent, the sodium carbonate, the nano alumina and the polycarboxylic acid water reducer were put into a forced stirrer first so as to be stirred, then water was poured into the forced stirrer, the obtained mixture was stirred to form a pulp coating layer on the surface of the red mud-based sewage treatment agent, and natural curing was performed for 24 h to obtain the red mud-based ceramsite concrete.

Fifth Embodiment

1. A preparation method of a red mud-based sewage treatment agent includes the following steps:
   (1) in mass percent, red mud, coal gangue and iron tailings were respectively dried and ground and then sieved with a 400-mesh sieve to obtain red mud micro-powder, coal gangue micro-powder and iron tailings micro-powder, and the red mud micro-powder, the coal gangue micro-powder and the iron tailings micro-powder were mixed in a mass ratio of 4:2.5:3.5 to obtain a solid waste complex;
   (2) simulated industrial tail gas (mass concentration of carbon dioxide was about 16%) was used to perform acidification treatment on the solid waste complex obtained in step (1) for 2 h under the conditions that the temperature was 400° C., the humidity was 90% and the pressure was 0.2 MPa, and after the acidification treatment was completed, the solid waste complex was dried and ground and then sieved with a 400-mesh sieve to obtain a modified solid waste complex; and
   (3) in mass percent, 90% of the modified solid waste complex obtained in step (2), 4.5% of Portland cement, 0.5% of ultrafine silica fume (800 meshes), and 5.0% of cetyl ammonium bromide were mixed uniformly for pulping according to a water-cement ratio of 0.4, then granulating was performed in a granulating machine, and after the granulating was completed, natural curing was performed for 22 h to prepare a spherical red mud-based sewage treatment agent with a diameter 36-38 mm.

2. A preparation method of a red mud-based ceramsite concrete includes the following steps:
   (I) the red mud-based sewage treatment agent prepared in step (3) of the present embodiment was placed in sewage to adsorb pollutants, after the concentration of the pollutants in the sewage remains unchanged, an adsorption saturation state was reached, and the red mud-based sewage treatment agent was dried for later use; and
   (II) preparation of the red mud-based ceramsite concrete: in mass percent, 25% of solid waste complex micro-powder after acidification treatment, 30% of water, 55% of the red mud-based sewage treatment agent obtained in step (I), Portland cement accounting for 12% of the mass of the solid waste complex, carbide slag ultrafine powder (900 meshes) accounting for 3.5% of the mass of the solid waste complex, and a polycarboxylic acid water reducer accounting for 0.8% of the mass of the solid waste complex were weighed, then the solid waste complex micro-powder, the red mud-based sewage treatment agent, the Portland cement, the carbide slag ultrafine powder and the polycarboxylic acid water reducer were put into a forced stirrer first so as to be stirred, then water was poured into the forced stirrer, the obtained mixture was stirred to form a pulp coating layer on the surface of the red mud-based sewage treatment agent, and natural curing was performed for 24 h to obtain the red mud-based ceramsite concrete.

Sixth Embodiment

1. A preparation method of a red mud-based sewage treatment agent includes the following steps:
   (1) in mass percent, red mud, coal gangue and iron tailings were respectively dried and ground and then sieved with a 400-mesh sieve to obtain red mud micro-powder, coal gangue micro-powder and iron tailings micro-powder, and the red mud micro-powder, the coal gangue micro-powder and the iron tailings micro-powder were mixed in a mass ratio of 6:3:1 to obtain a solid waste complex;
   (2) simulated industrial tail gas (mass concentration of carbon dioxide was about 16%) was used to perform acidification treatment on the solid waste complex obtained in step (1) for 4 h under the conditions that the temperature was 200° C., the humidity was 100% and the pressure was 2.0 MPa, and after the acidification treatment was completed, the solid waste complex was dried and ground and then sieved with a 400-mesh sieve to obtain a modified solid waste complex; and
   (3) in mass percent, 90% of the modified solid waste complex obtained in step (2), 1.0% of a naphthalene water reducer, 2.0% of sodium carbonate, 2.0% of ultrafine zeolite (900 meshes) and 5.0% of sodium dodecylsulfonate were mixed uniformly for pulping according to a water-cement ratio of 0.2, then granulating was performed in a granulating machine, and after the granulating was completed, natural curing was performed for 24 h to prepare a spherical red mud-based sewage treatment agent with a diameter 36-40 mm.

2. A preparation method of a red mud-based ceramsite concrete includes the following steps:
   (I) the red mud-based sewage treatment agent prepared in step (3) of the present embodiment was placed in sewage to adsorb pollutants, after the concentration of the pollutants in the sewage remains unchanged, an adsorption saturation state was reached, and the red mud-based sewage treatment agent was dried for later use; and
   (II) preparation of the red mud-based ceramsite concrete: in mass percent, 18% of solid waste complex micro-powder after acidification treatment, 17% of water, 65% of the red mud-based sewage treatment agent obtained in step (I), sodium silicate accounting for 15% of the mass of the solid waste complex, sulphoaluminate cement accounting for 1.0% of the mass of the solid waste complex, and a polycarboxylic acid water reducer accounting for 0.6% of the mass of the solid waste complex were weighed, then the solid waste complex micro-powder, the red mud-based sewage treatment agent, the sodium silicate, the sulphoaluminate cement and the polycarboxylic acid water reducer were put into a forced stirrer first so as to be stirred, then water was poured into the forced stirrer, the obtained mixture was stirred to form a pulp coating layer on the surface of the red mud-based sewage treatment agent, and natural curing was performed for 24 h to obtain the red mud-based ceramsite concrete.

Seventh Embodiment

1. A preparation method of a red mud-based sewage treatment agent includes the following steps:
   (1) in mass percent, red mud and blast furnace slag were respectively dried and ground and then sieved with a 400-mesh sieve to obtain red mud micro-powder and blast furnace slag micro-powder, and the red mud micro-powder and the blast furnace slag micro-powder were mixed in a mass ratio of 6:4 to obtain a solid waste complex; and (2) in mass percent, 90% of the solid waste complex obtained in step (1), 0.4% of a polycarboxylic acid water reducer, 4.0% of sodium silicate, 2.0% of ultrafine zeolite (900 meshes) and 3.6% of cetyl ammonium bromide were mixed uniformly for pulping according to a water-cement ratio of 0.35, then granulating was performed in a granulating machine, and after the granulating was completed, natural curing was performed for 24 h to prepare a spherical red mud-based sewage treatment agent with a diameter 5-8 mm.

Eighth Embodiment

1. A preparation method of a red mud-based sewage treatment agent includes the following steps:
(1) in mass percent, red mud, coal gangue and iron tailings were respectively dried and ground and then sieved with a 400-mesh sieve to obtain red mud micro-powder, coal gangue micro-powder and iron tailings micro-powder, and the red mud micro-powder, the coal gangue micro-powder and the iron tailings micro-powder were mixed in a mass ratio of 6:3:1 to obtain a solid waste complex; and
(2) in mass percent, 90% of the solid waste complex obtained in step (1), 0.4% of a naphthalene water reducer, 4.0% of sodium hydroxide, 2% of ultrafine zeolite (900 meshes) and 3.6% of sodium dodecylsulfonate were mixed uniformly for pulping according to a water-cement ratio of 0.3, then granulating was performed in a granulating machine, and after the granulating was completed, natural curing was performed for 24 h to prepare a spherical red mud-based sewage treatment agent with a diameter 10-13 mm.

Ninth Embodiment

A preparation method of a red mud-based ceramsite concrete includes the following steps: the red mud-based sewage treatment agent prepared in step (3) of the third embodiment was placed in sewage to adsorb pollutants, after the concentration of the pollutants in the sewage remains unchanged, an adsorption saturation state was reached, the red mud-based sewage treatment agent was dried, and then, the leaching amount of the pollution factors adsorbed in the red mud-based sewage treatment agent was tested directly.

Tenth Embodiment

A preparation method of a red mud-based ceramsite concrete includes the following steps: the red mud-based sewage treatment agent prepared in step (3) of the fourth embodiment was placed in sewage to adsorb pollutants, after the concentration of the pollutants in the sewage remains unchanged, an adsorption saturation state was reached, the red mud-based sewage treatment agent was dried, and then, the leaching amount of the pollution factors adsorbed in the red mud-based sewage treatment agent was tested directly.

Property Test

The indexes of the red mud-based sewage treatment agents and the red mud-based ceramsite concretes prepared in the first embodiment to the tenth embodiment were tested, wherein the strength was tested in accordance with the national standard GB/T 11969-2008 Test Method for Properties of Autoclaved Aerated Concrete. Results were shown in Table 2.

TABLE 2

| Property index | Red mud-based sewage treatment agent Phosphate radical adsorption rate/% | Red mud-based ceramsite concrete | |
| --- | --- | --- | --- |
| | | 28d compressive strength/MPa | $Cu^{2+}$ leaching amount/ppm |
| Embodiment 1 | 98.6 | 42.25 | 4.1 |
| Embodiment 2 | 99.5 | 34.71 | 0.9 |
| Embodiment 3 | 97.2 | 36.94 | 1.2 |
| Embodiment 4 | 96.8 | 45.73 | 1.8 |
| Embodiment 5 | 98.3 | 37.29 | 3.3 |
| Embodiment 6 | 99.1 | 40.16 | 2.6 |
| Embodiment 7 | 66.8 | — | — |
| Embodiment 8 | 63.3 | — | — |
| Embodiment 9 | — | — | 28.5 |
| Embodiment 10 | — | — | 24.7 |

It can be seen from the test data in Table 1 that the red mud-based ceramsite concrete prepared in the embodiments of the present invention has excellent compressive strength, which makes the mud-based cementing material of the present invention fully suitable for manufacturing buildings. The red mud-based ceramsite concrete was not only convenient to prepare, but also can realize the large-scale utilization of solid wastes.

At the same time, it can be seen from the test results of the adsorption capacity of the red mud-based sewage treatment agents prepared in the first embodiment to the eighth embodiment for phosphate radical ions in the sewage that compared with the treatment agent that was not prepared by acidification, the treatment agent obtained after acidification treatment on solid wastes by carbon dioxide has a significantly enhanced adsorption capacity for phosphate radical ions. After analysis and research, it was found that the main reason was that the solid wastes contain a large amount of metal ions which can be converted into nano carbonates in an acidification reaction process, and these carbonates in the form of ultrafine particles were distributed in the sewage treatment agent, so that the surface area of the sewage treatment agent can be significantly increased, and the adsorption efficiency in the sewage treatment process can be increased.

In addition, the leaching amount of $Cu^{2+}$ adsorbed in the red mud-based ceramsite concretes prepared in the first embodiment to the sixth embodiment and the ninth and tenth embodiments was tested under the same conditions, so as to evaluate the secondary pollution indexes of the red mud-based ceramsite concrete in the later use process. It can be seen from the results in Table 1 that when the solid waste complex pulp after acidification treatment by industrial tail gas is not used for coating, the leaching amount of $Cu^{2+}$ was significantly increased. After re-coating, since the chemical composition of the solid waste complex was dominated by elements such as silicon, aluminum and calcium, geopolymers with a three-dimensional network structure can be formed under the action of an alkali activator, and the polymerization products treat the adsorbed pollution factors and the inherent pollutants in the solid wastes in manners of chemical bonding, physical encapsulation and the like, so as to avoid the secondary pollution of the red mud-based adsorbent and ensure the environmental friendliness of the red mud-based ceramsite concrete.

In addition, by testing the pH value of the sewage treated with the red mud-based sewage treatment agents prepared in the first embodiment to the eighth embodiment, it was found that the sewage corresponding to the seventh and eighth embodiments was significantly alkaline, and the sewage corresponding to the first embodiment to the sixth embodiment was basically neutral. After further analysis and research, it was found that this was caused by a large amount of alkaline substances contained in the red mud. In a pollutant adsorption process, the leaching liquid of the red mud changes a neutral environment of the sewage to an alkaline environment, which causes secondary pollution, so that the sewage only can be discharged after the pH was adjusted again. By means of the acidification treatment, modification of the components of the red mud was realized, and furthermore, the impacts caused by strong alkalinity of the red mud were significantly reduced.

The above descriptions are merely preferred embodiments of this application and are not intended to limit this application. For those skilled in the art, this application may have various modifications and changes. Any modification, equivalent replacement, improvement and the like made without departing from the spirit and principle of this application shall fall within the protection scope of this application.

What is claimed is:

1. A red mud-based ceramsite concrete, wherein the raw material composition of the red mud-based ceramsite concrete comprises the following components in mass percent: 15-30% of a solid waste complex after acidification treatment, 55-75% of a red mud-based sewage treatment agent after adsorption of pollutants, and the balance being water; a shell formed by mixing the solid waste complex after acidification treatment with water is coated on the surface of the red mud-based sewage treatment agent after adsorption of pollutants; and the red mud-based sewage treatment agent after adsorption of pollutants is obtained using a red mud-based sewage treatment agent for sewage treatment; wherein the sewage treatment agent comprises the following components in mass percent: 80-90% of a solid waste complex subjected to acidification treatment, 2.0-15% of an alkali activator, 0-1.0% of a water reducer, 0.5-2.0% of an ultrafine additive, and 1.0-5.0% of a surfactant; and the solid waste complex comprises: at least one of 0-40% of blast furnace slag powder, 0-50% of fly ash, 0-30% of coal gangue powder and 0-35% of iron tailings powder and 40-60% of red mud powder; and the red mud-based sewage treatment agent is prepared by a method comprising the following steps:

(1) drying, grinding and sieving at least one of blast furnace slag, fly ash, coal gangue and iron tailings powder and red mud respectively, and then, uniformly mixing the obtained powder in proportion to obtain a solid waste complex;

(2) performing acidification treatment on the solid waste complex by means of industrial tail gas in heating and pressurizing states, and after the acidification treatment is completed, drying, grinding and sieving the obtained solid waste complex to obtain a modified solid waste complex; and (3) uniformly mixing the modified solid waste complex, the alkali activator, the water reducer, the ultrafine additive and the treatment agent in proportion, and then, pulping, granulating and curing the obtained mixture to obtain a red mud-based sewage treatment agent, is used for sewage treatment.

2. The red mud-based ceramsite concrete according to claim 1, wherein the red mud-based ceramsite concrete further comprises an auxiliary agent; a shell formed by mixing the solid waste complex after acidification treatment, the reinforcing agent, the alkali activator and the water reducer with water is coated on the surface of the red mud-based sewage treatment agent after adsorption of pollutants;

optionally, the reinforcing agent accounts for 0.5-4.0% of the mass of the solid waste complex after acidification treatment;

optionally, the water reducer accounts for 0.2-1.0% of the mass of the solid waste complex after acidification treatment;

optionally, the alkali activator accounts for 6.0-20% of the mass of the solid waste complex after acidification treatment; and optionally, the reinforcing agent comprises: at least one of carbide slag, sodium metaaluminate, sulphoaluminate cement, silica sol, nano calcium carbonate and nano alumina.

3. A preparation method of the red mud-based ceramsite concrete according to claim 1, comprising the following steps:

mixing the solid waste complex after acidification treatment and the red mud-based sewage treatment agent after adsorption of pollutants in proportion;

or mixing the auxiliary agent, the solid waste complex after acidification treatment and the red mud-based sewage treatment agent after adsorption of pollutants in proportion; and then adding water, stirring the obtained mixture to form a pulp coating layer on the surface of the red mud-based sewage treatment agent, and performing curing to obtain the red mud-based ceramsite concrete.

4. The red mud-based ceramsite concrete according to claim 2, wherein the auxiliary agent comprises at least one of a reinforcing agent, an alkali activator, and a water reducer.

5. The red mud-based ceramsite concrete according to claim 1, wherein the solid waste complex is subjected to acidification treatment by industrial tail gas.

6. The red mud-based ceramsite concrete according to claim 1, wherein the ultrafine additive comprises at least one of ultrafine zeolite, ultrafine silica fume, and ultrafine metal organic framework materials.

7. The red mud-based ceramsite concrete according to claim 1, wherein the surfactant comprises at least one of cetyl ammonium bromide, fatty amines, and sodium linear alkyl benzene sulfonate.

8. The red mud-based ceramsite concrete according to claim 1, wherein the solid waste complex subjected to acidification treatment is obtained by subjecting a solid waste complex to acidification treatment, wherein the solid waste complex is obtained by mixing the components after grinding, drying and sieving.

9. The red mud-based ceramsite concrete according to claim 1, wherein the red mud-based sewage treatment agent is spherical.

10. The red mud-based ceramsite concrete according to claim 1, wherein the red mud comprises: any one of the red muds produced by a Bayer method, a sintering method, or a combination method.

11. The red mud-based ceramsite concrete according to claim 1, wherein the alkali activator comprises: at least one of sodium hydroxide, sodium silicate, potassium hydroxide, potassium silicate, sodium carbonate, and ordinary Portland cement clinker.

12. The red mud-based ceramsite concrete according to claim 1, wherein the water reducer comprises: one of a polycarboxylic acid water reducer, an aliphatic water reducer, a naphthalene water reducer, a melamine water reducer, and a lignosulfonate water reducer.

13. The red mud-based ceramsite concrete according to claim 1, wherein in step (2), conditions of the acidification treatment are: a pressure of 0.2-2.0 MPa, a temperature of 60-400° C., a humidity of 40-100%, and a duration of 2.0-36 h.

14. The red mud-based ceramsite concrete according to claim 1, wherein in step (3), the water-cement ratio in the pulping step is 0.2-0.5.

15. The red mud-based ceramsite concrete according to claim 1, wherein in step (3), the curing is performed for 20-24 hours under natural conditions.

* * * * *